(12) United States Patent
Nakashita

(10) Patent No.: US 7,064,784 B2
(45) Date of Patent: Jun. 20, 2006

(54) IMAGE PICKUP APPARATUS ADAPTED TO CARRY OUT PARALLEL OPERATIONS IN A CONTINUOUS IMAGE PICKUP MODE, AND A CONTROL METHOD

(75) Inventor: Kazuhiko Nakashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 711 days.

(21) Appl. No.: 09/976,097

(22) Filed: Oct. 15, 2001

(65) Prior Publication Data
US 2002/0051643 A1  May 2, 2002

(30) Foreign Application Priority Data
Oct. 19, 2000  (JP)  .............................. 2000-319848

(51) Int. Cl.
*H04N 5/76* (2006.01)
(52) U.S. Cl. .................................................. 348/231.6
(58) Field of Classification Search ........... 348/231.99, 348/231.1, 231.2, 231.6, 231.9, 222.1, 223.1; 358/444
See application file for complete search history.

(56) References Cited

U.S. PATENT DOCUMENTS

| | | | |
|---|---|---|---|
| 5,532,740 A * | 7/1996 | Wakui ..................... | 348/231.2 |
| 5,867,214 A * | 2/1999 | Anderson et al. ........ | 348/231.6 |
| 6,018,363 A | 1/2000 | Horii | |
| 6,020,920 A * | 2/2000 | Anderson ................ | 348/222.1 |
| 6,177,956 B1 | 1/2001 | Anderson et al. | |
| 6,219,156 B1 * | 4/2001 | Yoshida et al. ............. | 358/444 |
| 6,493,028 B1 * | 12/2002 | Anderson et al. ........ | 348/222.1 |
| 6,518,999 B1 * | 2/2003 | Miyamoto ............... | 348/223.1 |
| 6,587,149 B1 * | 7/2003 | Yoneyama et al. ...... | 348/230.1 |
| 6,738,093 B1 * | 5/2004 | Kitagawa et al. ...... | 348/231.99 |

FOREIGN PATENT DOCUMENTS

JP  7-99629  4/1995

* cited by examiner

*Primary Examiner*—Aung Moe
(74) *Attorney, Agent, or Firm*—Fitzpatrick, Cella, Harper & Scinto

(57) ABSTRACT

For achieving high-speed continuous shooting and increasing the number of shots that can be picked-up continuously, within a limited buffer memory size, an image pickup apparatus is provided with a function of carrying out a first process of storing output data from an image pickup element on a first memory area and a function of carrying out a second process of processing data placed on the first memory area and storing the processed data on a second memory area, and is configured to perform the first and second processes in parallel.

5 Claims, 16 Drawing Sheets

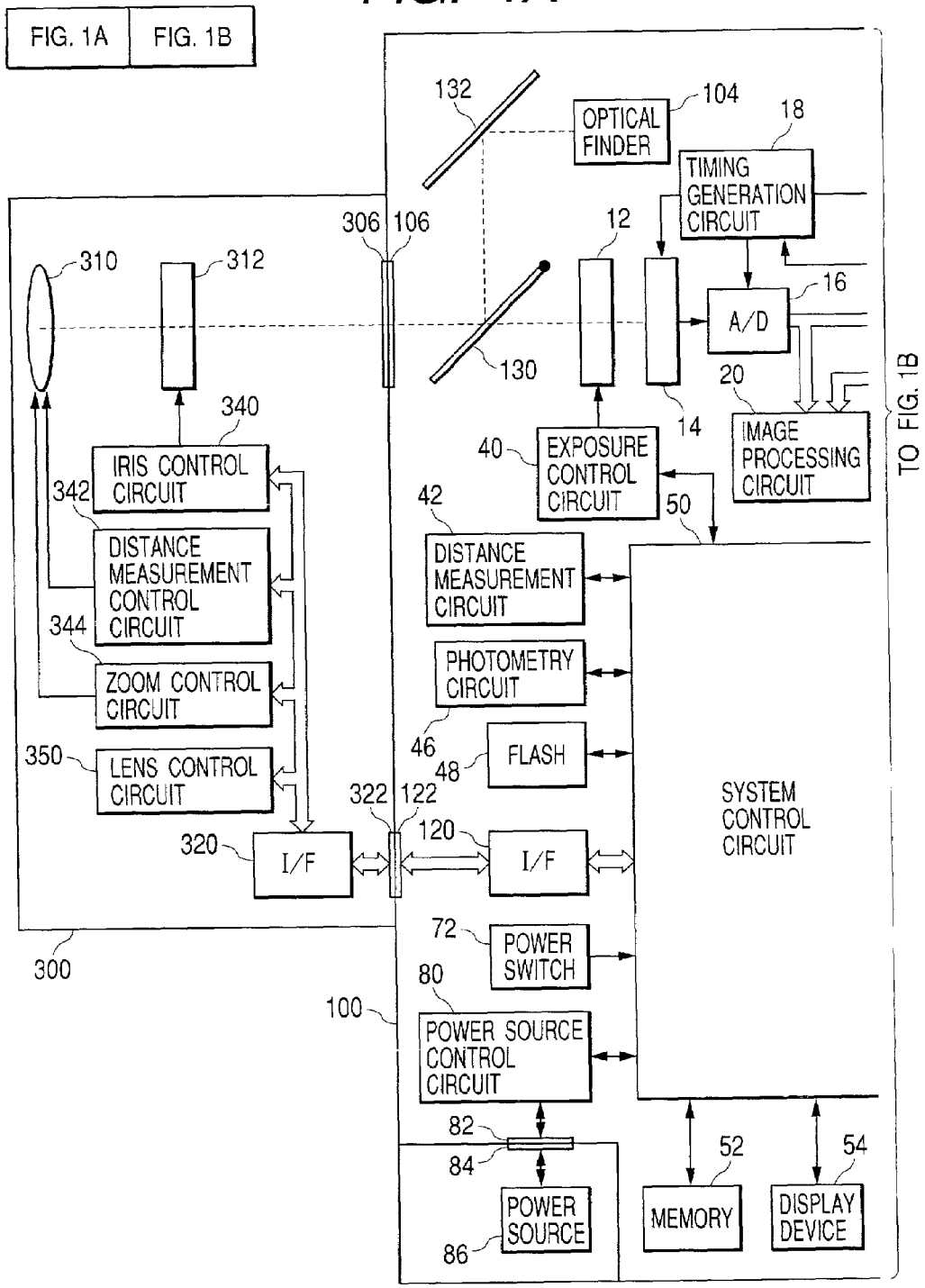

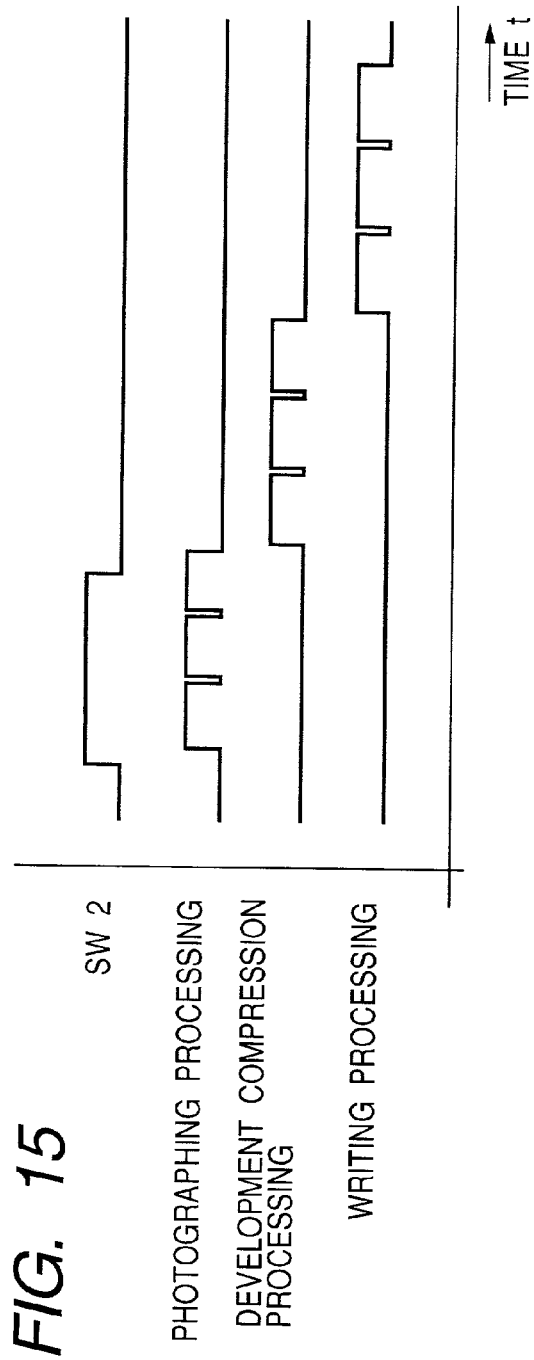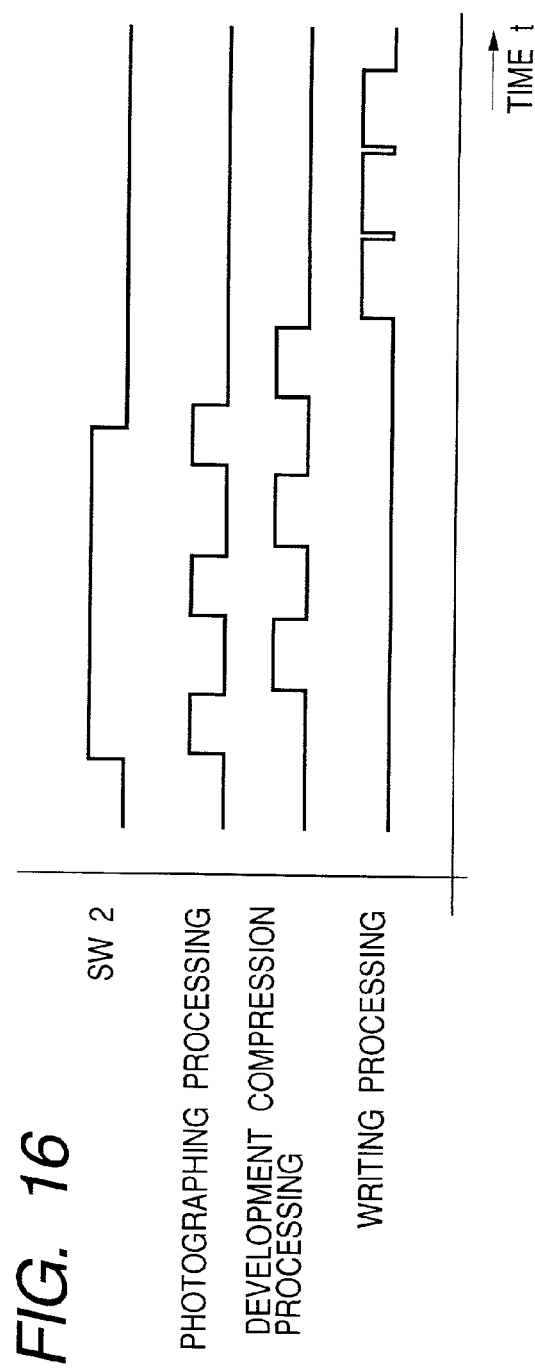

IMAGE PICKUP APPARATUS ADAPTED TO CARRY OUT PARALLEL OPERATIONS IN A CONTINUOUS IMAGE PICKUP MODE, AND A CONTROL METHOD

BACKGROUND OF THE INVENTION

1. Field of the Invention

The present invention relates to a process of storing photographic images in an image pickup apparatus.

2. Related Background Art

Conventionally, there are commercially available image pickup apparatus such as digital cameras and others for recording and reproducing still images picked up by an image pickup element such as a CCD or the like, using a memory card having a solid state memory device as a recording medium. These image pickup apparatus are often configured to perform the following processes: a photographing process of taking output data from the image pickup element once into a buffer memory, a development compression process of subjecting the data to image processing and compression processing and again storing the resultant data in the buffer memory, and thereafter a writing process of writing the data into a removable recording medium.

For these image pickup apparatus, a method of processing during continuous shooting was proposed as a method of first continuously carrying out photographing processes as long as the buffer memory had a vacant storage area, and thereafter carrying out the development compression process in the number of picked-up pictures. (Cf. Japanese Patent Application Laid-Open No. 7-99629.)

Another method commonly applied was a method of carrying out the photographing process of picking up one picture and immediately thereafter carrying out the development compression process for the picked-up picture. Timing charts during execution of processing in these methods are presented in FIG. 15 and FIG. 16, respectively.

However, the method of first continuously carrying out the photographing process up to the end of the space in the buffer memory and thereafter carrying out the development compression process in the number of picked-up pictures as described above permits higher continuous shooting speed in continuous shooting than the method of alternately carrying out the photographing process and the development compression process, but has the problem that, because the capacity of data outputted after the photographing process is greater than that obtained after the compression process of the data, the number of pictures that could be continuously stored in the buffer memory become smaller, to decrease the number of pictures that could be continuously picked-up during continuous shooting.

On the other hand, the method of alternately carrying out the photographing process and the development compression process has the problem that the continuously shooting speed is slow. Further, the both methods take a long total processing time, because the photographing process and the development compression process are sequentially carried out.

SUMMARY OF THE INVENTION

The present invention has been accomplished in order to solve the above problems and an object of the present invention is to increase the continuous shooting speed and increase in the number of pictures that can be picked-up continuously, within the limited buffer memory size.

In order to accomplish the above object, according to one embodiment of the present invention, there is provided an image pickup apparatus including an image pickup element; a memory for storing an image obtained by the image pickup element; a signal processing circuit adapted to effect predetermined signal processing on an image read out of a first area of the memory; and a memory control circuit adapted to, in a mode of continuously picking up still images, carry out in parallel a writing operation of writing an image obtained by the image pickup element, into the first area of the memory and a readout operation of reading an image already stored in the first area of the memory, to effect the predetermined signal processing by the signal processing circuit.

Other objects and features of the present invention will become apparent from the specification and drawings which follow.

BRIEF DESCRIPTION OF THE DRAWINGS

FIG. 15 is a timing chart of processing during continuous shooting in the conventional image pickup apparatus; and FIG. 16 is a timing chart of processing during continuous shooting in the conventional image pickup apparatus.

DESCRIPTION OF THE PREFERRED EMBODIMENTS

Figure 1B:
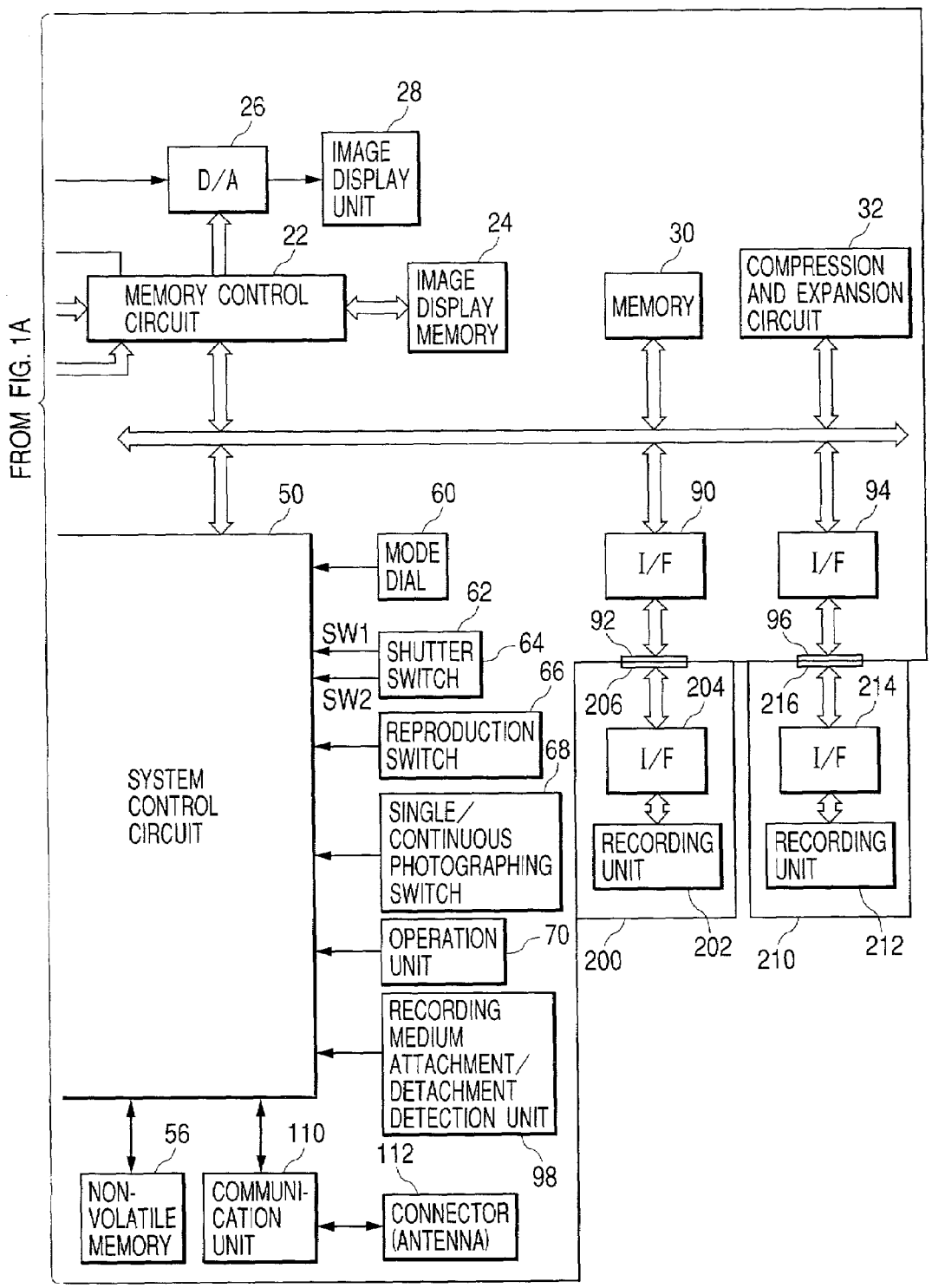
FIG. 1, comprised of FIGS. 1A and 1B, is a schematic diagram showing a configuration including an image pickup apparatus according to an embodiment of the present invention.

Embodiments will be described below with reference to the drawings. FIGS. 1A and 1B are a block diagram of an image pickup apparatus according to a first embodiment of the present invention.

In FIGS. 1A and 1B, numeral 100 designates an image pickup apparatus. In FIGS. 1A and 1B, numeral 12 denotes a shutter for controlling an exposure amount on image pickup element 14, and 14 an image pickup element for converting an optical image into electric signals.

Rays incident to lens 310 can be guided via iris stop 312, lens mounts 306 and 106, mirror 130, and shutter 12 to be focused as an optical image on the image pickup element 14 according to the single lens reflex camera method.

Numeral 16 represents an A/D converter for converting analog signal output from the image pickup element 14 into digital signals. Numeral 18 indicates a timing generation circuit for supplying clock signals and/or control signals to the image pickup element 14, A/D converter 16, and D/A converter 26, which is controlled by memory control circuit 22 and system control circuit 50.

Numeral 20 denotes an image processing circuit, which performs a predetermined pixel interpolation processing and color conversion processing on data from the A/D converter 16 or data from the memory control circuit 22.

The image processing circuit 20 executes a predetermined operation processing using the data of picked-up image as occasion demands, and, based on the operation result obtained, the system control circuit 50 can execute AF (autofocus) processing of the TTL (through-the-lens) method, AE (auto exposure) processing, and EF (flash light control) processing to control exposure control circuit 40 and distance measurement control circuit 42.

Further, the image processing circuit 20 also executes a predetermined operation processing using the data of picked-up image and executes AWB (auto white balance) processing of the TTL method, based on the operation result obtained.

In the present embodiment, since the apparatus is provided with dedicated distance measurement circuit 42 and photometry circuit 46, the apparatus may also be configured to perform each of the AF (autofocus) processing, AE (auto exposure) processing, and EF (flash light control) processing using the distance measurement circuit 42 and photometry circuit 46, but not to execute each of the AF (autofocus) processing, AE (auto exposure) processing, and EF (flash light control) processing using the above image processing circuit 20.

In another configuration, the apparatus may also be configured to execute each of the AF (autofocus) processing, AE (auto exposure) processing, and EF (flash light control) processing using the distance measurement circuit 42 and photometry circuit 46 and further to execute each of the AF (autofocus) processing, AE (auto exposure) processing, and EF (flash light control) processing using the image processing circuit 20.

Numeral 22 denotes a memory control circuit, which controls the A/D converter 16, timing generation circuit 18, image processing circuit 20, image display memory 24, D/A converter 26, memory 30, and compression and expansion circuit 32.

Data from the A/D converter 16 is written via the image processing circuit 20 and memory control circuit 22 or directly via the memory control circuit 22 into the image display memory 24 or into the memory 30.

Numeral 24 denotes an image display memory, 26 a D/A converter, and 28 an image display unit consisting of a TFT LCD or the like, and image data for display written in the image display memory 24 is displayed on the image display unit 28 through the D/A converter 26.

By sequentially displaying the picked-up image data by use of the image display unit 28, it is feasible to implement the electronic finder function.

The image display unit 28 can optionally turn the display on or off in response to an instruction from the system control circuit 50, and it is possible to greatly decrease power consumption of the image pickup apparatus 100 by keeping the display off.

Numeral 30 designates a memory for storing picked-up still images, which has a storage capacity enough to store the prescribed number of still images. This permits high-speed and large-volume image writing in the memory 30 even in the case of continuous photographing for continuously taking a plurality of still images, or in the case of panorama photographing.

The memory 30 can also be used as a working area of the system control circuit 50.

Numeral 32 represents a compression and expansion circuit for compressing or expanding image data by adaptive discrete cosine transform (ADCT) or the like, which reads in an image stored in the memory 30 to compress or expand it, and then writes the thus processed data into the memory 30.

Numeral 40 is an exposure control circuit for controlling the shutter 12 in cooperation with an iris control circuit 340 for controlling the iris 312, based on photometry information from the photometry circuit 46.

Numeral 42 indicates a distance measurement circuit for carrying out the AF (autofocus) processing, which can measure a focus condition of an image focused as an optical image by guiding the rays incident to the lens 310 via the iris 312, lens mounts 306 and 106, mirror 130, and a submirror (not shown) for distance measurement into the distance measurement circuit 42 by the single lens reflex method.

Numeral 46 denotes a photometry circuit for executing the AE (auto exposure) processing, which can measure an exposure condition of an image focused as an optical image by guiding the rays incident to the lens 310 via the iris 312, lens mounts 306 and 106, mirrors 130 and 132, and a lens (not shown) for photometry into the photometry circuit 46 by the single lens reflex method.

The photometry circuit 46 also has the EF (flash light control) processing function in cooperation with flash 48.

Numeral 48 is the flash, which also has a function of projecting AF auxiliary light and a flash light control function.

On the basis of the operation result of arithmetic operation in the image processing circuit 20 performed on the image data picked up by the image pickup element 14, the system control circuit 50 can also implement the exposure control and AF (autofocus) control using the video TTL method to effect control over the exposure control circuit 40, iris control circuit 340, and distance measurement control circuit 342.

Further, the apparatus may also be configured to perform the AF (autofocus) control, using both the measurement result by the distance measurement circuit 42 and the operation result of arithmetic operation in the image processing circuit 20 performed on the image data picked up by the image pickup element 14.

Then the apparatus may be configured to perform the exposure control, using both the measurement result by the photometry circuit 46 and the operation result of arithmetic operation in the image processing circuit 20 performed on the image data picked up by the image pickup element 14.

Numeral 50 represents a system control circuit for controlling the whole of the image pickup apparatus 100, and 52 a memory for saving constants, variables, programs, etc., for the operation of the system control circuit 50.

Numeral 54 represents a display device such as a liquid crystal display, a loudspeaker, or the like for indicating operating conditions, messages, etc., through use of letters, graphics, sound, etc., in accordance with execution of programs in the system control circuit 50, which is located at a single place or at plural places for easy view near the control part of the image pickup apparatus 100, and which is composed, for example, of a combination of LCD and/or LED, sound producing elements, and so on. Some functions of the display device 54 are placed in an optical finder 104.

Among indications of the display device 54, indications to be displayed in the LCD or the like include, for example, single shot/continuous shooting indication, self-timer indication, compression rate indication, number-of-recording-pixel indication, number-of-recorded-shots indication, number-of-rest-available-shots indication, shutter speed indication, f-number indication, exposure correction indication, flash indication, red-eye relief indication, macro photograph indication, buzzer setting indication, clock battery rest indication, battery rest indication, error indication, information indication with numerals of plural digits, indication of attachment/detachment of recording media 200 and 210, indication of attachment/detachment of the lens unit 300, communication I/F operation indication, date and time indication, indication indicating a connection state with an external computer, and so on.

Among the indications of the display device 54, indications to be displayed in the optical finder 104 include, for example, focus indication, indication of completion of preparation for photography, hand shake warning indication, flash charge indication, flash charge completion indication, shutter speed indication, f-number indication, exposure correction indication, indication of writing operation into a recording medium, and so on.

Further, among the indications of the display device 54, indications to be displayed in the LED or the like include, for example, focus indication, indication of completion of preparation for photography, hand shake warning indication, flash charge indication, flash charge completion indication, indication of writing operation into a recording medium, macro photography setting notice indication, secondary battery charge condition indication, and so on.

Among the indications of the display device 54, those to be displayed by a lamp or the like include, for example, a self-timer notice lamp, and so on. This self-timer notice lamp can also be used as a lamp for the AF auxiliary light.

Numeral 56 denotes an electrically erasable and recordable, nonvolatile memory, which is, for example, an EEPROM or the like.

Numerals 60, 62, 64, 66, 68, and 70 are control members for entering various operation instructions to the system control circuit 50, each of which is composed of one or more selected from a switch, a dial, a touch panel, pointing by detection of a visual axis, a voice recognition system, and so on.

These control members will be described specifically below. The control member 60 is a mode dial switch, through which a user can switch to select one among functional photographing modes including an automatic photographing mode, a program photographing mode, a shutter speed priority photographing mode, an aperture priority photographing mode, a manual photographing mode, a focal depth priority (depth) photographing mode, a portrait photographing mode, a landscape photographing mode, a close-up photographing mode, a sports photographing mode, a night view photographing mode, a panorama photographing mode, and so on.

The control member 62 is a shutter switch SW1, which is switched on in the middle of depressing operation on a shutter button (not shown) to issue an instruction to initiate operations including the AF (autofocus) processing, AE (auto exposure) processing, AWB (auto white balance) processing, EF (flash light control) processing, and so on.

The control member 64 is a shutter switch SW2, which is turned on upon completion of the depressing operation on the shutter button to issue an instruction to initiate a series of processing operations including the exposure processing of writing signals read out of the image pickup element 12 via the A/D converter 16 and memory control circuit 22 into the memory 30, the development processing with the operations in the image processing circuit 20 and in the memory control circuit 22, and the recording processing of reading image data from the memory 30, compressing the data in the compression and expansion circuit 32, and writing the image data in the recording medium 200 or 210.

The control member 66 is a reproduction switch, which issues an instruction to initiate the reproducing operation of reading a picked-up image out of the memory 30 or the recording medium 200 or 210 and displaying it in the image display unit 28, in a state of a photographing mode.

The control member 68 is a single/continuous photographing switch, through which the user can select either of a single shot mode in which upon activation of the shutter switch SW2 only one shot is picked-up and thereafter the apparatus goes into a standby state, and a continuous shooting mode in which continuous shooting is carried on during activation of the shutter switch SW2.

The control member 70 is an operation unit consisting of various buttons, a touch panel, etc., which includes a menu button, a set button, a macro button, a multiscreen reproduction page break button, a flash setting button, a single/continuous/self-timer switch button, a menu movement + (plus) button, a menu movement − (minus) button, a reproduced image movement + (plus) button, a reproduced image − (minus) button, a picked-up image quality selection button, an exposure correction button, a date/time setting button, a select/switch button for setting selection and switching of various functions during photographing in the panorama mode or the like and during execution of reproduction, a determine/execute button for setting determination and execution of various functions during photography in the panorama mode or the like and during execution of reproduction, an image display ON/OFF switch for setting ON/OFF of the image display unit 28, a quick review ON/OFF switch for setting a quick review function for automatically reproducing data of a picked-up image immediately after photography, a compression mode switch being a switch for selecting a compression rate in JPEG compression or for selecting a CCDRAW mode of digitizing signals from the image pickup element without compression and recording the raw digital data in the recording medium, a reproduction switch for permitting the user to set either function mode among a reproduction mode, a multiscreen reproduction and erasing mode, a PC connection mode, etc., an AF mode setting switch for permitting the user to set either of a one-shot AF mode in which, upon activation of the shutter switch SW1, the autofocus operation is started, and in which, once the apparatus becomes in focus, the in-focus state is kept, and a servo AF mode in which the autofocus operation is continuously carried on during activation of the shutter switch SW1, and so on.

For each function of the above-stated plus buttons and minus buttons, provision of a rotary dial switch will permit the user to select a number or a function more lightly.

Numeral 72 designates a power switch, through which the user can switch to select each mode of power on or power off of the image pickup apparatus 100. The power switch 72 also permits the user to switch to set power on and power off of various attachments such as the lens unit 300, an external flash device, recording media 200, 210, etc., connected to the image pickup apparatus 100.

Numeral 80 designates a power control circuit, which is composed of a battery detecting circuit, a DC—DC converter, a switch circuit for switching blocks to be energized. The power control circuit 80 is configured to detect presence/absence of a battery mounted, a type of the battery, and remaining charge of the battery, to control the DC—DC converter, based on the detection results and an instruction from the system control circuit 50, and to supply a necessary voltage to each block including the recording medium for a necessary period.

Numeral 82 represents a connector, 84 a connector, and 86 a power supply which is either selected from primary batteries such as alkali batteries, lithium batteries, etc., secondary batteries such as NiCd batteries, NiMH batteries, Li batteries, etc., an AC adapter, and so on.

Numerals 90 and 94 indicate interfaces to recording media such as memory cards, hard disks, etc., numerals 92 and 96 connectors for connection with the recording media such as memory cards, hard disks, etc., and 98 a recording medium attachment/detachment detection unit for detecting whether the recording medium 200 or 210 is connected to the connector 92 and/or 96.

The present embodiment is described on the assumption of possession of two systems of interfaces and connectors for mounting the recording media. It is a matter of course that the interfaces and connectors for mounting the recording media can be constructed either in a single system or in plural systems. It is also possible to employ a configuration provided with a combination of interfaces and connectors according to different standards.

The interfaces and connectors may be those compliant with the standards for the PCMCIA cards, CF (compact flash) cards, and so on.

Further, when the interfaces 90 and 94 and connectors 92 and 96 are comprised of those compliant with the standards for the PCMCIA cards, CF (compact flash) cards, and so on, it becomes feasible to exchange image data and management information attached to the image data with another computer or with a peripheral device such as a printer or the like through connection with either of various communication cards including a LAN card, a modem card, a USB card, an IEEE1394 card, a P1284 card, a SCSI card, a communication card of PHS or the like, and so on.

Numeral 104 represents an optical finder, on which the rays incident to the lens 310 can be guided via the iris 312, lens mounts 306 and 106, and mirrors 130 and 132 by the single lens reflex method to be focused as an optical image. This permits the user to perform photography using only the optical finder 104, without using the electronic finder function by the image display unit 28. In the optical finder 104 there are provided some functions of the display device 54, e.g., the focus indication, hand shake warning indication, flash charge indication, shutter speed indication, f-number indication, exposure correction indication, and so on.

Numeral 110 is a communication unit, which has various communication functions including RS232C, USB, IEEE1394, P1284, SCSI, a modem, LAN, radio communication, and so on.

Numeral 112 denotes a connector for connecting the image pickup apparatus 100 with another device through the communication unit 110, or an antenna in the case of radio communication.

Numeral 120 represents an interface for connecting the image pickup apparatus 100 with the lens unit 300, within the lens mount 106, numeral 122 a connector for electrically connecting the image pickup apparatus 100 with the lens unit 300, and 124 a lens attachment/detachment detection unit for detecting whether the lens unit 300 is mounted to the lens mount 106 and/or connector 122.

The connector 122 has a function of exchanging control signals, state signals, data signals, etc., between the image pickup apparatus 100 and the lens unit 300, and also has a function of supplying electric currents at various voltages. The connector 122 may be configured to implement transmission, not only through electric communication, but also through optical communication, sound communication, and the like.

Numerals 130 and 132 denote mirrors, which can guide the rays incident to the lens 310 to the optical finder 104 by the single lens reflex method. The mirror 132 can be configured either in a configuration of a quick return mirror or in a configuration of a half mirror.

Numeral 200 denotes a recording medium such as a memory card, a hard disk, or the like. The recording medium 200 is comprised of a recording unit 202 consisting of a semiconductor memory, a magnetic disk, or the like, an interface 204 to the image pickup apparatus 100, and a connector 206 for connection with the image pickup apparatus 100.

Numeral 210 denotes a recording medium such as a memory card, a hard disk, or the like. The recording medium 210 is comprised of a recording unit 212 consisting of a semiconductor memory, a magnetic disk, or the like, an interface 214 to the image pickup apparatus 100, and a connector 216 for connection with the image pickup apparatus 100.

Numeral 300 represents a lens unit of the interchangeable lens type. Numeral 306 represents a lens mount for mechanically coupling the lens unit 300 to the image pickup apparatus 100. The lens mount 306 incorporates various functions for electrically connecting the lens unit 300 with the image pickup apparatus 100.

Numeral 310 indicates a photographing lens, and 312 an iris. Numeral 320 represents an interface for connecting the lens unit 300 with the image pickup apparatus 100, within the lens mount 306, and 322 a connector for electrically connecting the lens unit 300 with the image pickup apparatus 100.

The connector 322 has a function of exchanging control signals, state signals, data signals, etc., between the image pickup apparatus 100 and the lens unit 300, and also has a function of supplying or accepting electric currents at various voltages. The connector 322 may be constructed to implement transmission, not only through electric communication, but also through optical communication, sound communication, and the like.

Numeral 340 designates an iris control circuit for controlling the iris 312 in cooperation with the exposure control circuit 40 for controlling the shutter 12, based on the photometry information from the photometry circuit 46.

Numeral 342 represents a distance measurement control circuit for controlling focusing of the photographing lens 310, and 344 a zoom control circuit for controlling zooming of the photographing lens 310.

Numeral 350 indicates a lens system control circuit for controlling the whole of the lens unit 300. The lens system control circuit 350 also has a function of a memory for storing operation constants, variables, programs, etc., and a function of a nonvolatile memory for retaining identification information such as a number specific to the lens unit 300 or the like, management information, function information such as an f-number at full aperture, a minimum f-number, a focal length, etc., present and past settings, and so on. It is also possible to employ the structure of the block diagram shown in FIGS. 14A and 14B, as the image pickup apparatus of the present embodiment. In the image pickup apparatus of FIGS. 14A and 14B, the image processing circuit 20, memory control circuit 22, compression and expansion circuit 32, and interfaces 90, 94 are integrated in a one-chip LSI (Large Scale Integration) 900 for processing of image signals.

Figure 2:
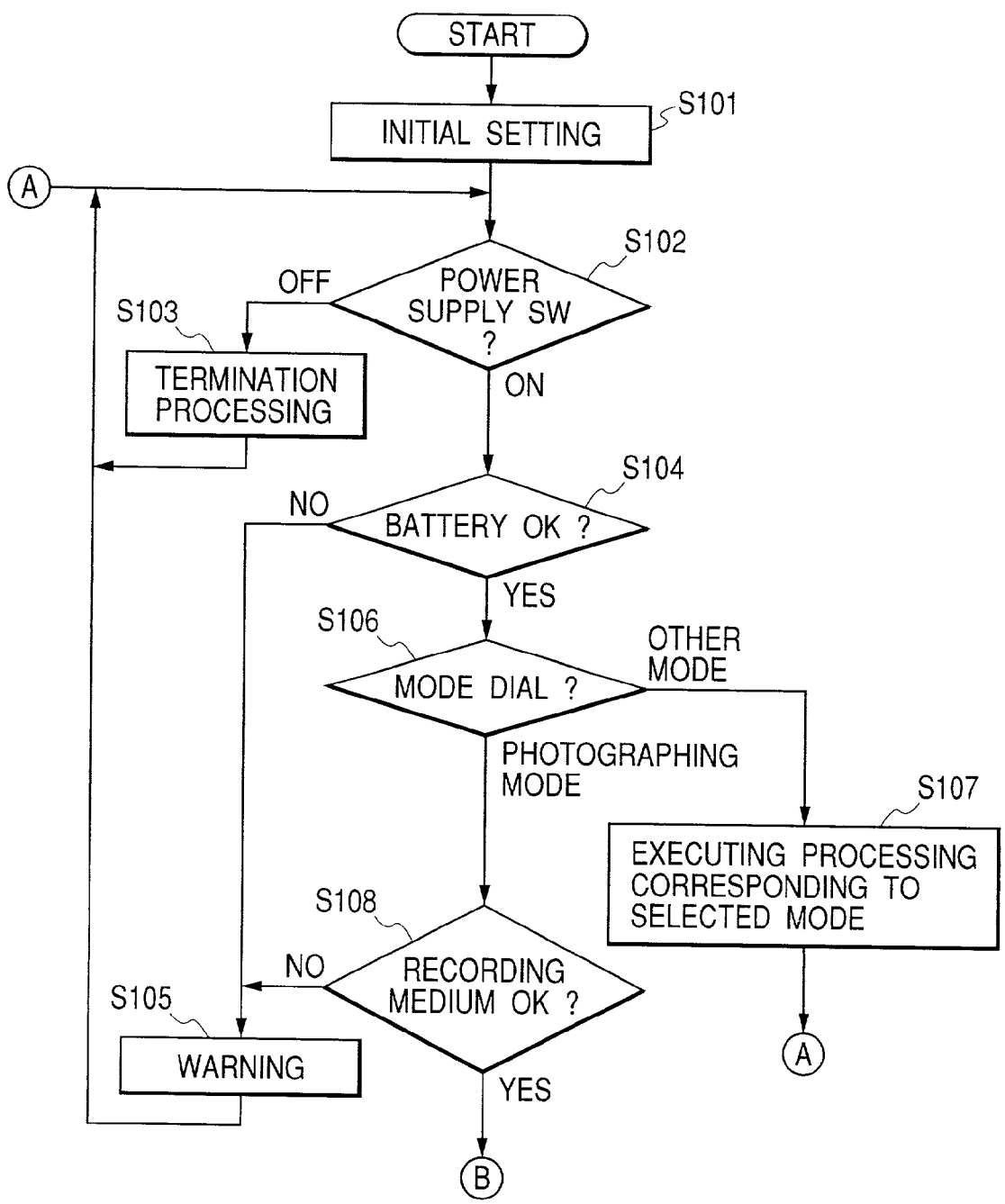
FIG. 2 is a flowchart showing part of a main routine in the image pickup apparatus according to the embodiment of the present invention.

FIG. 2 is a flowchart of the main routine in the image pickup apparatus 100 of the present embodiment. The operation of the image pickup apparatus 100 will be described below referring to FIG. 2 and FIG. 3.

Upon input of power, e.g., upon exchange of battery, the system control circuit 50 initializes flags, control variables, etc., to effect a predetermined initial setting necessary in each part of the image pickup apparatus 100 (S101).

The system control circuit 50 judges a set position of the power switch 66. When the power switch 66 is set at the power-off position (S102), the system control circuit 50 performs a predetermined termination processing, e.g., a process of changing the display in each display unit into an end state, recording necessary parameters and settings including the flags, control variables, etc., and the set mode in the nonvolatile memory 56, and interrupting unnecessary power in each part of the image pickup apparatus 100, including the image display unit 28, by the power control circuit 80 (S103), and thereafter returns to S102.

When the power switch 66 is set at the power-on position (S102), the system control circuit 50 determines whether the remaining capacity and operating situation of the power supply 86 consisting of the battery or the like are suitable for the operation of the image pickup apparatus 100, by the power control circuit 80 (S104). If they are not suitable, a predetermined warning is given through an image or voice by the display device 54 (S105), and then the control circuit returns to S102.

If there is no problem in the power supply 86 (S104), the system control circuit 50 judges a set position of the mode dial 60. When the mode dial 60 is set in a photographing mode (S106), the system control circuit 50 moves to S108.

When the mode dial 60 is set in either of the other modes (S106), the system control circuit 50 executes a processing corresponding to the selected mode (S107) and returns to S102 after completion of the processing.

The system control circuit 50 determines whether the recording medium 200 or 210 is mounted, acquires the management information of image data recorded in the recording medium 200 or 210, and determines whether the operating condition of the recording medium 200 or 210 is suitable for the operation of the image pickup apparatus 100, particularly, for the recording/reproducing operation of the image data in or from the recording medium (S108). If the operating condition is not suitable, the system control circuit 50 gives a predetermined warning indication through an image or voice by the display device 54 (S105), and then returns to S102.

After determining whether the recording medium 200 or 210 is mounted, acquiring the management information of image data recorded in the recording medium 200 or 210, and determining whether the operating condition of the recording medium 200 or 210 is suitable for the operation of the image pickup apparatus 100, particularly, for the recording/reproducing operation of image data in or from the recording medium (S108), the system control circuit 50 goes to S121 if the operating condition is suitable.

If the shutter switch SW1 is off (S121), the system control circuit 50 returns to S102. If the shutter switch SW1 is on (S121), the system control circuit 50 performs the distance measurement and photometry processing of carrying out the distance measurement process to focus the photographing lens 10 on a subject and carrying out the photometry process to determine an f-number and a shutter speed (S122), and then goes to S125. In the photometry process, setting of the flash is also carried out if necessary.

This distance measurement and photometry processing S122 will be described later in detail with reference to FIG. 4. When the shutter switch SW2 is on at S125, the system control circuit 50 goes to a continuous photographing sequence S130. This continuous photographing sequence S130 will be described later in detail with reference to FIGS. 6 to 8.

When the shutter switch SW2 is off (S125), the present processing is repeated before the shutter switch SW1 becomes off (S126). Once the shutter switch SW1 becomes off (S126), the system control circuit 50 will return to S102.

Figure 3:
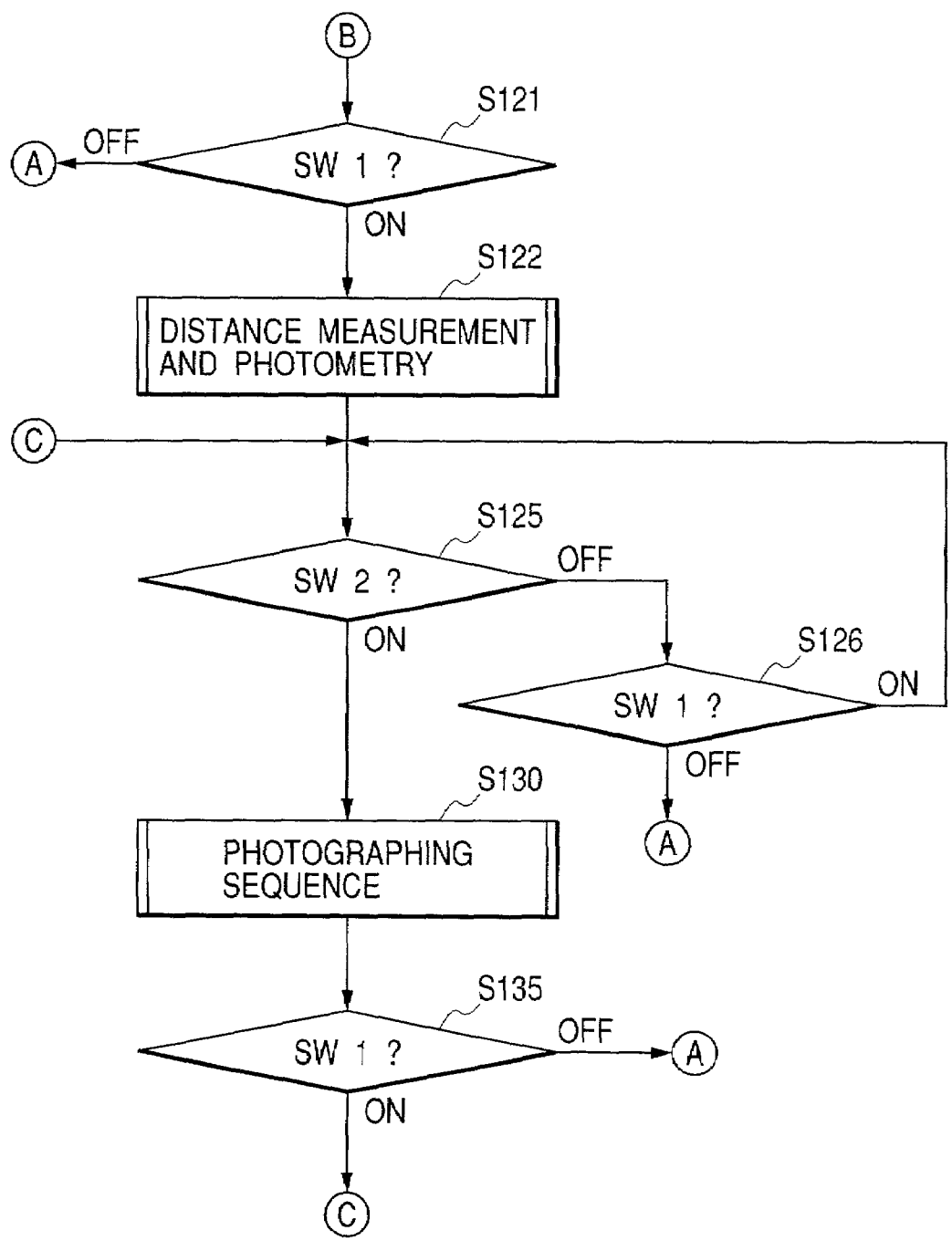
FIG. 3 is a flowchart showing part of the main routine in the image pickup apparatus according to the embodiment of the present invention.
Figure 4:
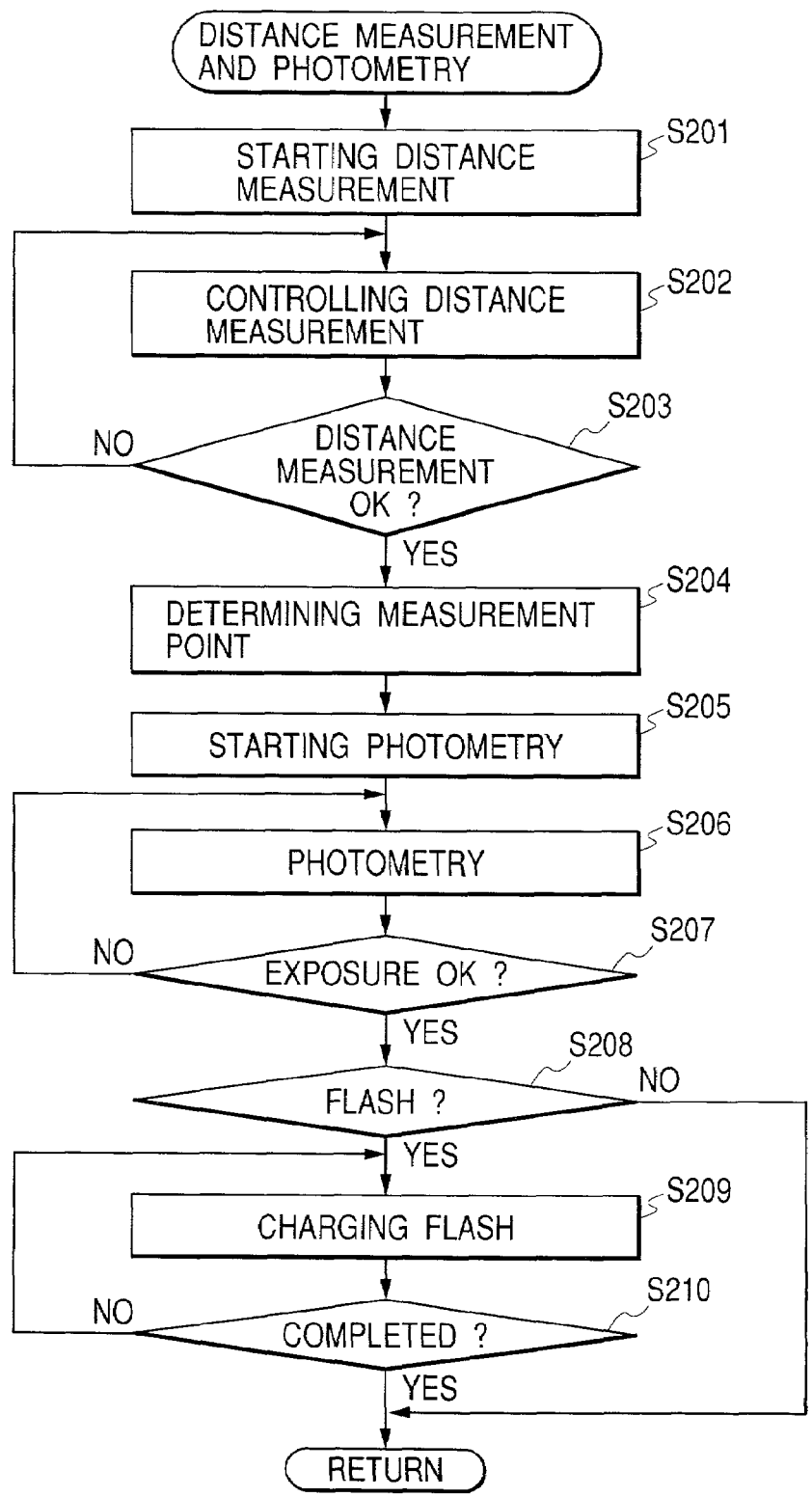
FIG. 4 is a flowchart of distance measurement and photometry processing in the image pickup apparatus according to the embodiment of the present invention.

FIG. 4 is a detailed flowchart of the distance measurement and photometry processing at S122 of FIG. 3. In the distance measurement and photometry processing, exchange of various signals between the system control circuit 50 and the iris control circuit 340 or the distance measurement control circuit 342 is implemented via the interface 120, connector 122, connector 322, interface 320, and lens control circuit 350.

The system control circuit 50 starts the AF (autofocus) processing through use of the image pickup element 14, the distance measurement circuit 42, and the distance measurement control circuit 342 (S201).

The system control circuit 50 executes such AF control (S202) that the rays incident to the lens 310 are guided via the iris 312, lens mounts 306 and 106, mirror 130, and submirror (not shown) for distance measurement into the distance measurement circuit 42 to form an image focused as an optical image, a focus state of the thus formed image is judged, and the system control circuit 50 detects the focus state through use of the distance measurement circuit 42 while driving the lens 310 through use of the distance measurement control circuit 342 until the distance measurement (AF) results in an in-focus judgment (S203).

When the distance measurement (AF) results in an in-focus judgment (S203), the system control circuit 50 determines a distance measurement point in focus out of a plurality of distance measurement points in a photographic screen, stores distance measurement data and/or set parameters together with data of the determined distance measurement point in an internal memory of the system control circuit 50 or in the memory 52, and then proceeds to S205.

Then the system control circuit 50 starts the AE (auto exposure) processing, using the photometry circuit 46 (S205).

The system control circuit 50 measures an exposure state of the image focused as an optical image by guiding the rays incident to the lens 310 via the iris 312, lens mounts 306 and 106, mirrors 130 and 132, and lens (not shown) for photometry into the photometry circuit 46, and performs the photometry processing (S206) through use of the photometry control circuit 40 until exposure (AE) is judged appropriate (S207).

When exposure (AE) is judged appropriate (S207), the system control circuit 50 stores the photometry data and/or set parameters in the internal memory of the system control circuit 50 or in the memory 52 and then goes to S208.

In accordance with the result of the exposure (AE) detected in the photometry processing S206 and the photographing mode set by the mode dial 60, the system control circuit 50 determines an aperture value (Av value) and a shutter speed (Tv value).

In accordance to the shutter speed (Tv value) thus determined, the system control circuit 50 then determines a charge accumulation time for the image pickup element 14 and performs the photographing processing.

Using the measurement data obtained in the photometry processing S206, the system control circuit 50 determines whether flash is necessary (S208). If flash is necessary, the system control circuit 50 sets a flash flag and charges the flash 48 (S209) until the the flash 48 is fully charged (S210).

After completion of the charging of the flash 48 (S210), the distance measurement and photometry processing routine S122 is terminated.

Figure 5:
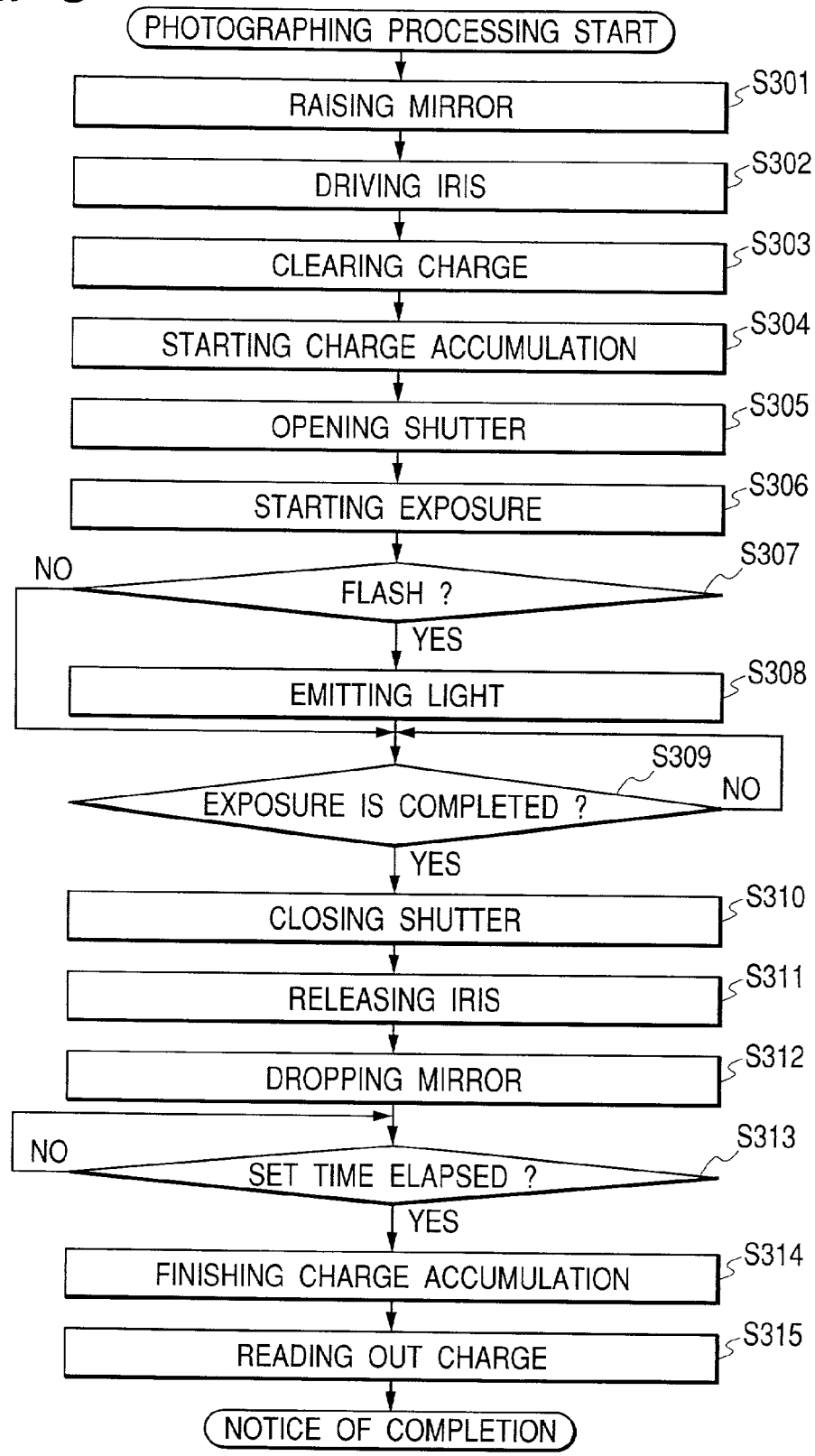
FIG. 5 is a flowchart of photographing processing in the image pickup apparatus according to the embodiment of the present invention.
Figure 6:
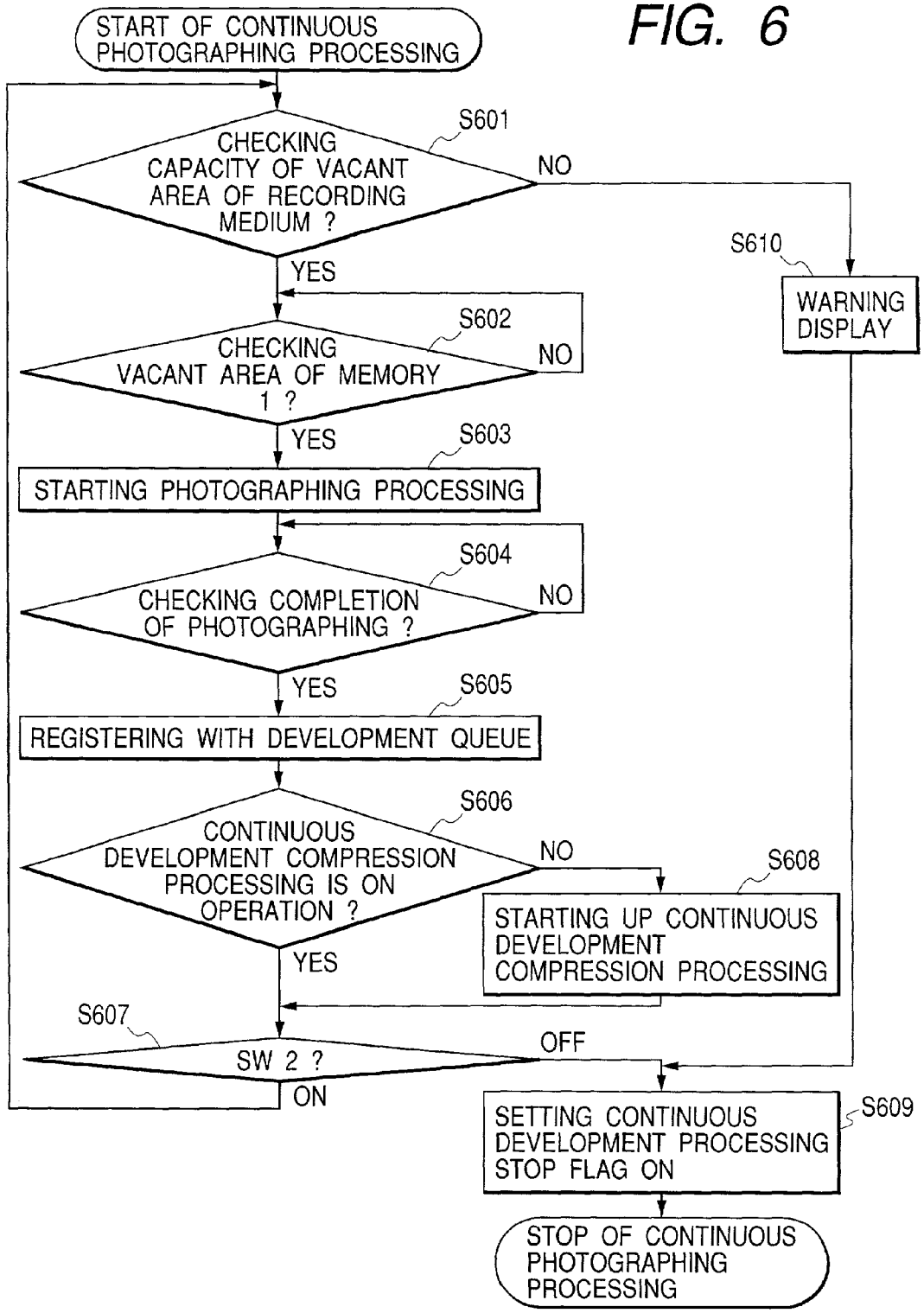
FIG. 6 is a flowchart of continuous photographing processing in the image pickup apparatus according to the embodiment of the present invention.

FIG. 5 is a detailed flowchart of the photographing processing started at S603 in FIG. 6.

In the photographing processing, exchange of various signals between the system control circuit 50 and the iris control circuit 340 or the distance measurement control circuit 342 is implemented via the interface 120, connector 122, connector 322, interface 320, and lens control circuit 350.

The system control circuit 50 moves the mirror 130 to a mirror up position by a mirror driver (not shown) (S301) and drives the iris 312 to a predetermined aperture value by the iris control circuit 340 in accordance with the photometry data stored in the internal memory of the system control circuit 50 or in the memory 52 (S302).

The system control circuit 50 performs a charge clearing operation of the image pickup element 14 (S303), thereafter starts accumulation of charge in the image pickup element 14 (S304), then opens the shutter 12 by the exposure control circuit 40 (S305), and starts exposure of the image pickup element 14 (S306).

Here the system control circuit 50 determines whether the flash 48 is necessary, by the flash flag (S307), and then lights up the flash if necessary (S308).

The system control circuit 50 awaits an end of exposure of the image pickup element 14 according to the photometry data (S309), closes the shutter 12 by the exposure control circuit 40 (S310), and terminates the exposure of the image pickup element 14.

The system control circuit 50 drives the iris 312 to the aperture value at full aperture by the iris control circuit 340 (S311), and moves the mirror 130 to a mirror down position by the mirror driver (not shown) (S312).

After the set charge accumulation time has elapsed (S313), the system control circuit 50 terminates the accumulation of charge in the image pickup element 14 (S314), reads charge signals out of the image pickup element 14, and writes the picked-up image data through the A/D converter 16, the image processing circuit and the memory control circuit 22, or through a connection from the A/D converter 16 directly through a connection from the memory control circuit 22 into a predetermined area of the memory 30 (S315).

Receiving a notice of completion of the writing of the picked-up image data, the system control circuit 50 then terminates the photographing processing routine.

Figure 9:
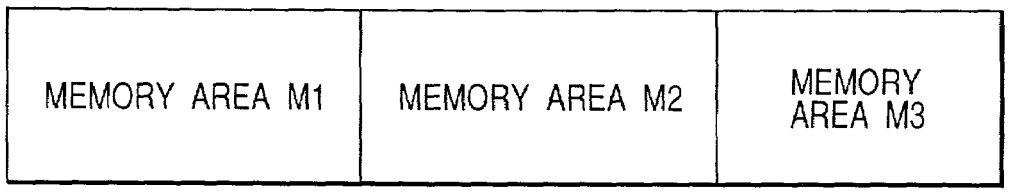
FIG. 9 is a schematic diagram showing area division of a memory in the embodiment of the present invention.

FIG. 9 shows area division of the memory 30 in the present embodiment. A memory area M1 is an area for storing output image data from the image pickup element 14 in the photographing processing. A memory area M2 is an area for storing output image data in the development and compression processing. A memory area M3 is an area for storing data except for the output data in the photographing processing and the output image data in the development and compression processing.

The memory capacity allocated to the memory area M1 may be larger or smaller than, or equal to that allocated to M2. Sizes of the respective areas may also be varied according to the operation modes of the image pickup apparatus. The capacity of the memory area M3 may be null.

However, the memory area M1 needs to have a capacity enough to store at least output data of one image in the photographing processing. The memory area M2 also needs to have a capacity sufficient to store at least output data of one image in the development and compression processing.

FIG. 6 shows a detailed flow of the continuous photographing processing. When a command to start the continuous photographing processing is invoked, it is first checked whether a vacant capacity of the recording medium 200 is enough for the photographing processing (S601). The details of this check will be described later.

When the vacant capacity of the recording medium 200 is not sufficient (S601), a warning is displayed in order to prevent newly processed image data from being overwritten on the already processed image data stored in the memory area M2 (S610). Then the control circuit sets a continuous development processing stop flag (S609) and terminates the continuous photographing processing.

When the vacant capacity of the recording medium 200 is sufficient (S601), the control circuit then checks whether there is a sufficient vacant area for storage of output data in the photographing process to be carried out from now on, on the memory area M1 (S602).

The capacity of the memory area M1 is set so that the result of the check at S602 is always yes on the occasion of the photographing process of the first shot.

When there is a sufficient vacant area for storage of output image data in the photographing process on the memory area M1, the control circuit starts the photographing processing (S603). When there exists no sufficient vacant area on the memory area M1, the control circuit stops the photographing process in order to prevent the newly output image data from the image pickup element 14 from being overwritten on the image data already stored in the memory area M1.

The details of the photographing processing were described above referring to FIG. 5. The control circuit awaits a notice of completion of the photographing processing (S604), and upon completion of the photographing processing, the control circuit registers output data in the photographing processing in a development and compression queue (S605). On this occasion, for the area in which the output data in the photographing processing is stored on the memory area M1, information to indicate "in use" is saved on the memory 52.

Then the control circuit checks whether the continuous development compression processing is active (S606).

When it is not active, the control circuit starts the continuous development and compression processing (S608). The details of the continuous development and compression processing will be described later referring to FIG. 7.

Then the control circuit checks the shutter switch SW2. When the shutter switch SW2 is on, the control circuit repeats the sequential processing. When the shutter switch SW2 is off, the control circuit sets a continuous development processing stop flag (S609) and terminates the continuous photographing processing.

Figure 7:
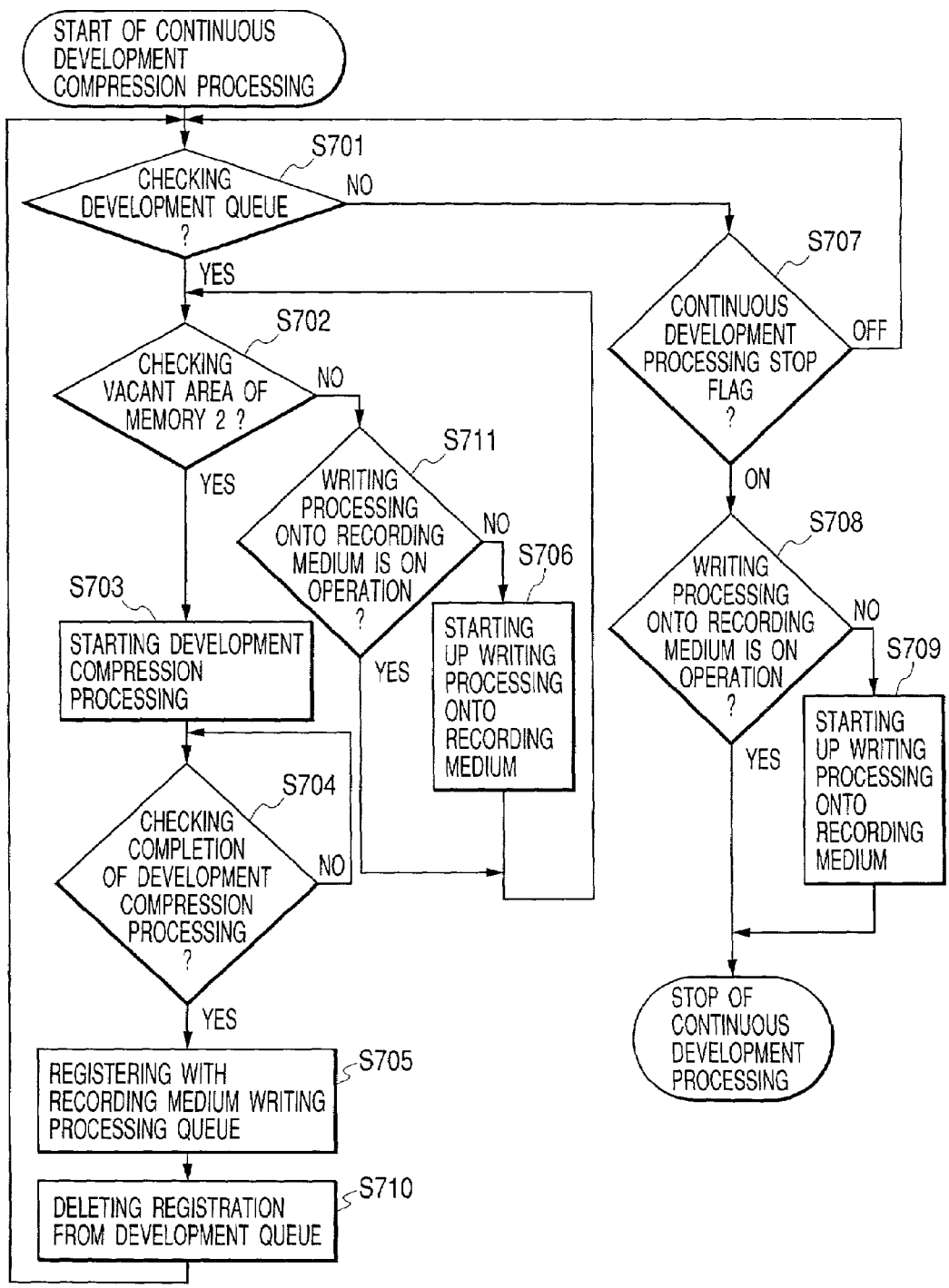
FIG. 7 is a flowchart of continuous development compression processing in the image pickup apparatus according to the embodiment of the present invention.

FIG. 7 shows a detailed flow of the continuous development compression processing. When the continuous photographing processing is started, the system control circuit 50 first checks whether there is data registered in the development queue (S701). When there is no data registered in the development queue, the control circuit checks the continuous development processing stop flag (S707) and repeats the checking of the development queue in the absence of this flag. If the continuous development processing stop flag is present (S707), the control circuit checks whether the writing processing onto the recording medium is active (S708). When the writing processing is not active, the control circuit starts the writing processing onto the recording medium (S709) and then stops the continuous development processing. The writing processing onto the recording medium will be described later referring to FIG. 8.

When there is data registered in the development queue (S701), the control circuit checks whether the vacant area of the memory area M2 is greater than the capacity of output data in the development compression processing, in order to prevent the newly processed image data from being overwritten on the processed image data already stored in the memory area M2 (S702). When there is not enough vacant area, the control circuit checks whether the writing operation onto the recording medium is active (S711). When the writing processing is not active, the control circuit starts the writing processing onto the recording medium (S706) and returns to the vacant area check of the memory area M2 (S702). During repetition of this, the vacant area on the memory area M2 is increased by the writing processing onto the recording medium (the details of which will be described later referring to FIG. 8), whereby it becomes feasible to secure a vacant area on the memory area M2 (S702). Then the control circuit starts the development compression processing (S703). The details of the development compression processing at S703 will be described later referring to FIG. 10.

Awaiting completion of the development compression processing (S704), the control circuit registers the output data in a recording medium writing processing queue (S705). On this occasion, for the area in which the output data in the development compression processing is stored in the memory area M2, information to indicate "in use" is held in the memory 52.

In addition, as to the area in which the picked-up image data subjected to the development compression processing is stored on the memory area M1, the system control circuit 50 deletes the information indicating that the picked-up image data on that area is in use, from the memory 52.

Then the control circuit deletes the development-compression-processed data, having been registered in the development queue, from the development queue (S710).

Then the control circuit repeats these operations from the checking to check whether registered data is present in the development queue (S701).

Figure 10:
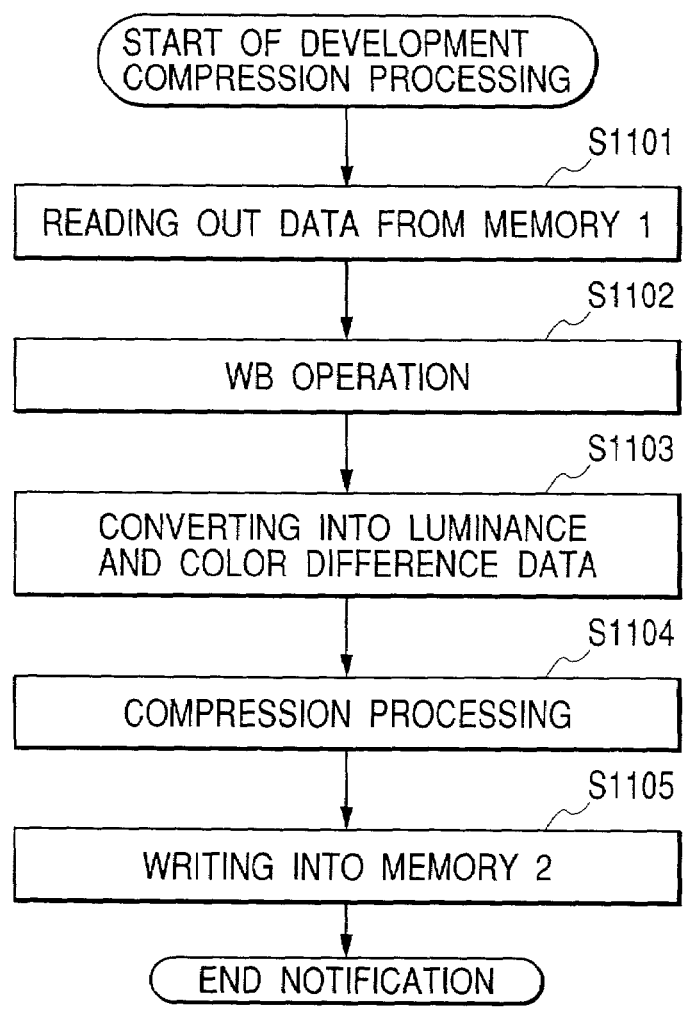
FIG. 10 is a flowchart of development compression processing in the image pickup apparatus according to the embodiment of the present invention.

FIG. 10 is a flowchart of the development compression processing. When the development compression processing is started, the system control circuit 50 first reads photographic data from the memory area M1 (S1101). Then the control circuit performs the white balance (WB) operation (S1102), executes processing of converting data into luminance and color difference data (S1103), subjects the result to compression processing (S1104), writes the result in the memory area M2 (S1105), and notifies of completion of writing.

Figure 8:
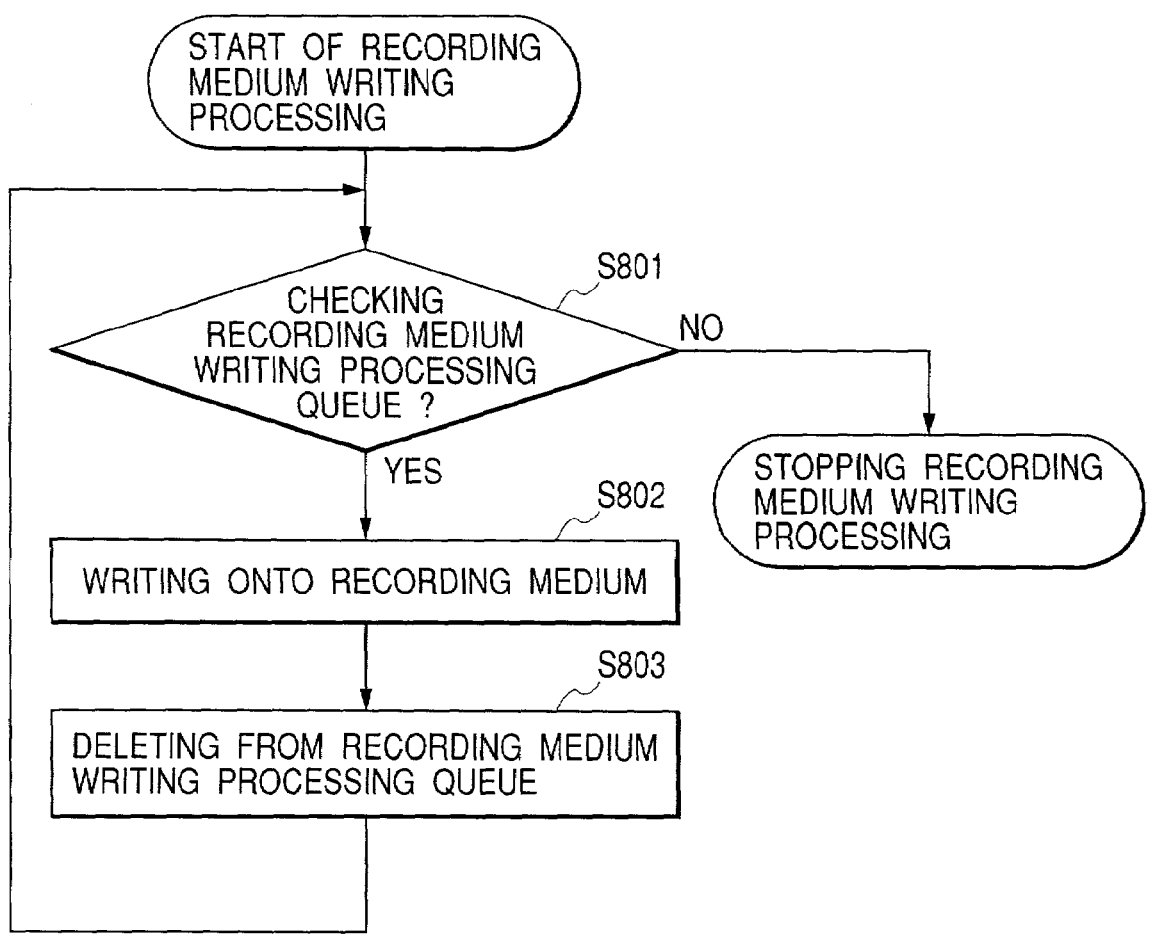
FIG. 8 is a flowchart of writing processing into a recording medium in the image pickup apparatus according to the embodiment of the present invention.

FIG. 8 shows a detailed flow of the recording medium writing processing. The system control circuit 50 first checks whether there is data registered in the recording medium writing queue (S801). If there is no data registered in the recording medium writing queue, the control circuit terminates the recording medium writing processing. If there is data registered in the recording medium writing queue, the control circuit writes the data onto the recording medium 200 (S802). After completion of the writing, the control circuit deletes the written data, having been registered in the recording medium writing queue, from the recording medium writing queue (S803). On this occasion, as to the region in which the developed and compressed data, which was written onto the recording medium, is stored on the memory area M2, the system control circuit 50 deletes the information to indicate "in use," from the memory 52.

Figure 11:
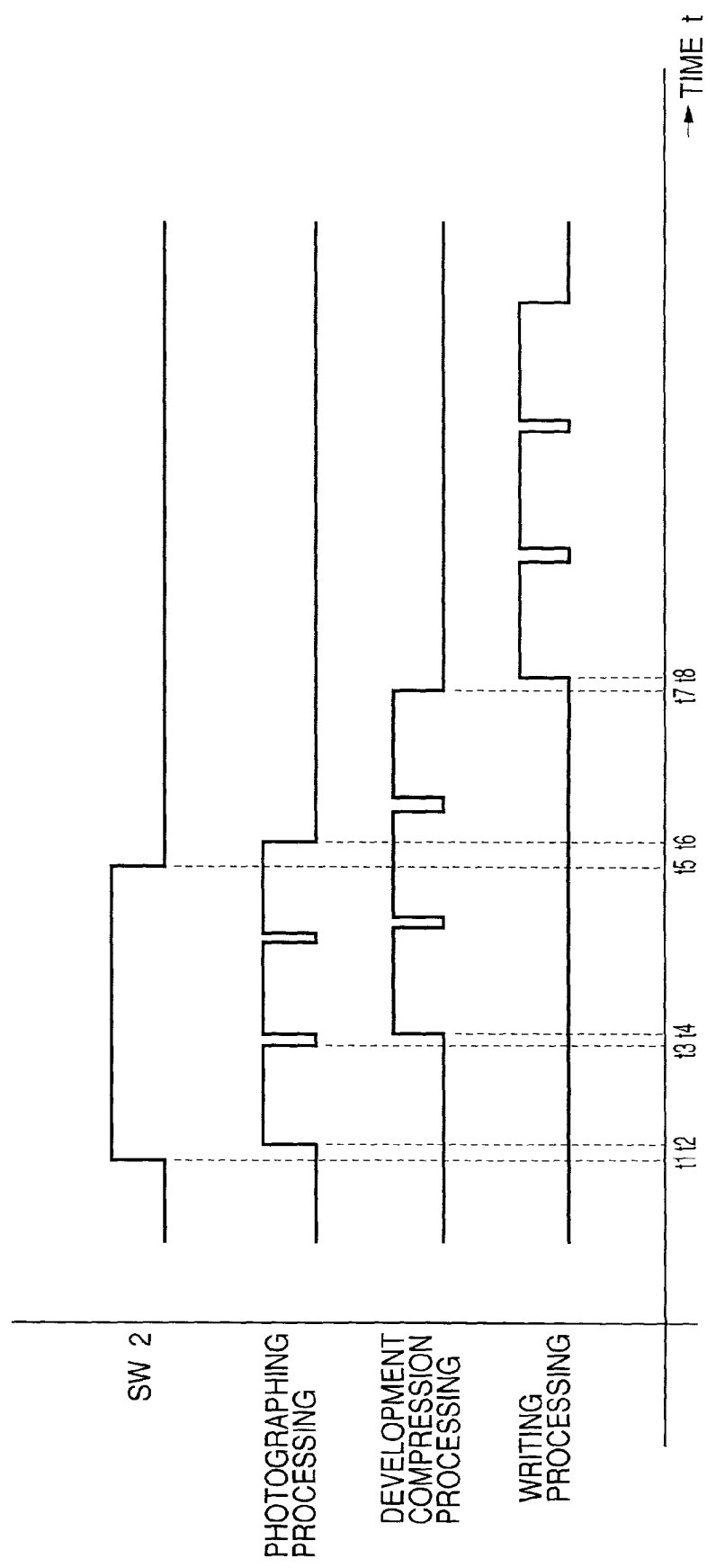
FIG. 11 is a timing chart of processing during continuous photography in the image pickup apparatus according to the embodiment of the present invention.

An example of a timing chart during execution of the above-described flow is presented in FIG. 11. FIG. 11 is the timing chart during execution of continuous photographing of three shots. When the switch SW2 is switched on (at t1), the photographing processing is started (at t2).

After completion of photographing of the first shot (at t3), the development compression processing is started (at t4). Since the switch SW2 is turned off (at t5) during photographing of the third shot, the photographing processing is terminated after photographing of the third shot (at t6). After completion of the development compression processing of the third shot (t7), the writing processing onto the recording medium is started (at t8).

As described above, the apparatus according to the first embodiment of the present invention is configured to carry out the photographing processing and the development compression processing in parallel from the second shot in continuous photographing, which can largely decrease the processing time and increase the number of shots that can be picked-up continuously.

A modification example of the above-stated embodiment will be described below. The structure in this example is the same as in the first embodiment and thus the description thereof is omitted herein. The processes except for the continuous development compression processing are the same as those in the first embodiment and the description thereof is omitted herein.

Figure 12:
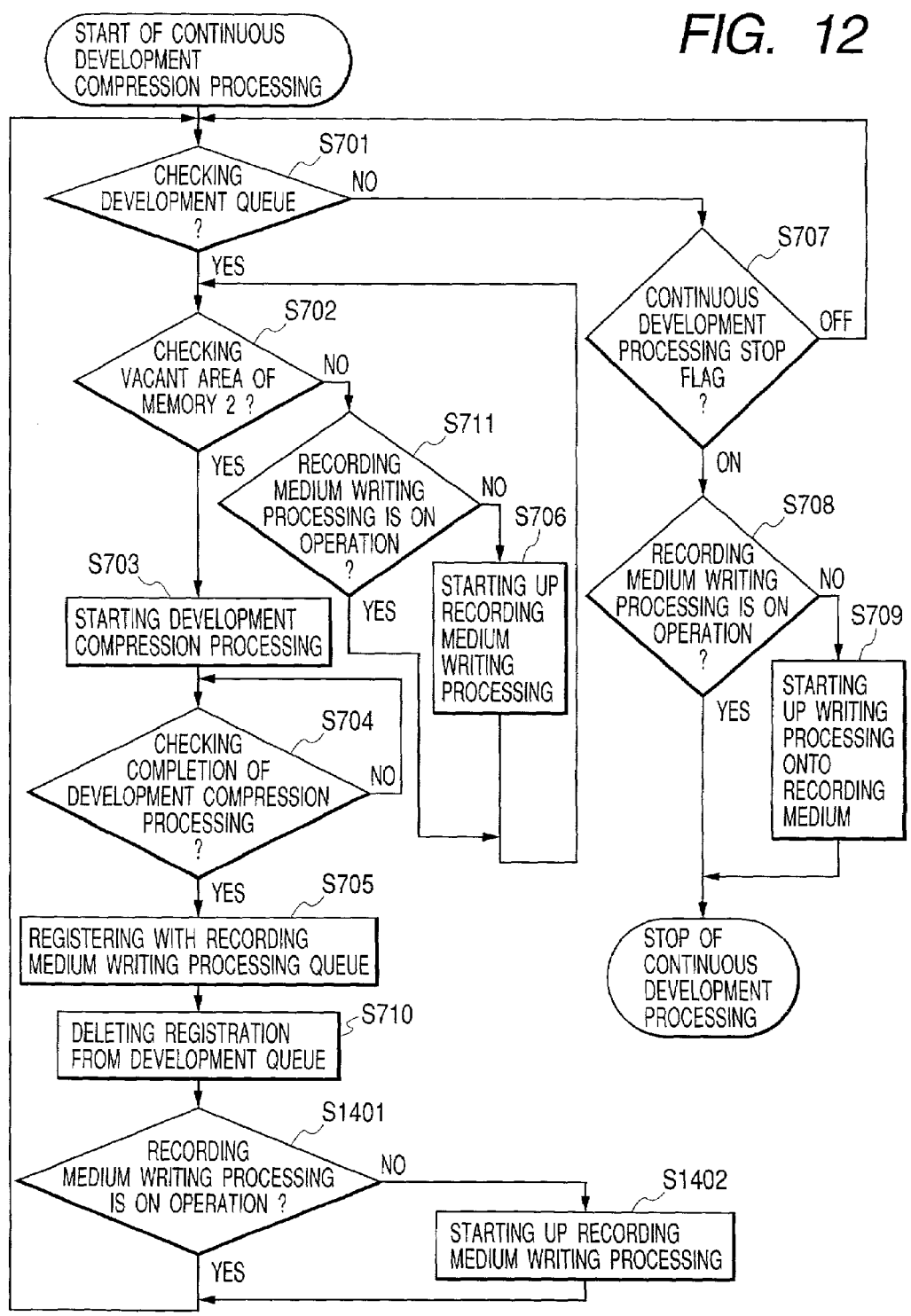
FIG. 12 is a flowchart of continuous development compression processing in the image pickup apparatus according to a modification of the embodiment of the present invention.

FIG. 12 is a flowchart of the continuous development compression processing in the modification example. Processes at steps S701 to S711 are the same as those at the same step numbers in FIG. 7 described in the first embodiment. The present embodiment adopts a configuration for starting the writing processing onto the recording medium 200 or 210 immediately after completion of the development compression processing of the first shot, without awaiting completion of the development compression processing of all images. The system control circuit 50 deletes registered data from the development queue (S710), thereafter checks whether the writing processing onto the recording medium 200 or 210 is active (S1401), and starts the writing processing onto the recording medium (S1402) when the writing processing is not active. Then the control circuit repeats the processing.

Figure 13:
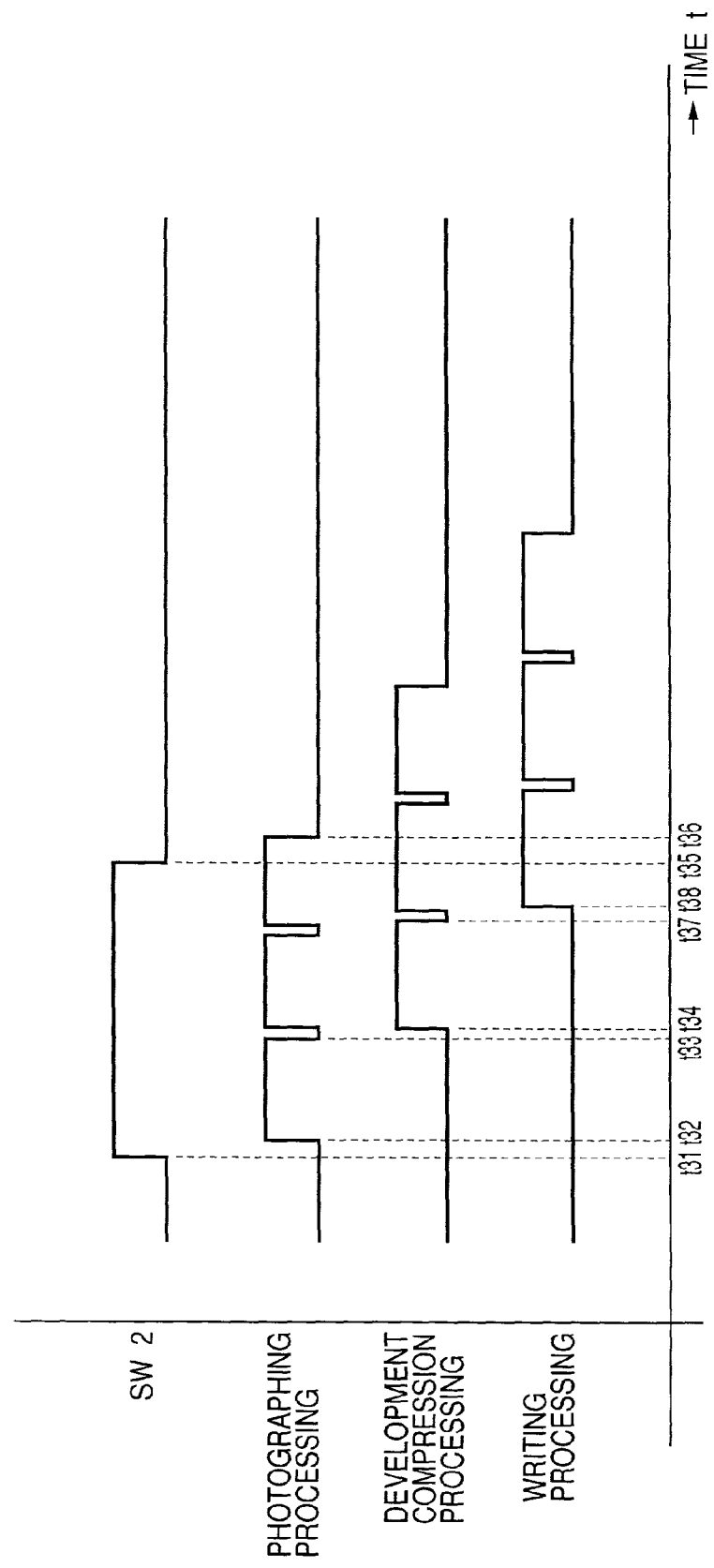
FIG. 13 is a timing chart of processing in continuous photography in the image pickup apparatus according to the modification of the embodiment of the present invention.

FIG. 13 shows a timing chart during execution of continuous photographing where the flowchart of FIG. 12 is employed as to the continuous development compression processing. When the switch SW2 is turned on (at t31), the photographing processing is started (at t32). After photographing of the first shot (t33), the development compression processing is started (at t34). After completion of the development compression processing of the first shot (t37), the writing processing onto the recording medium is started (at t38). Since the switch SW2 is turned off during photographing of the third shot (at t35), the photographing processing is terminated after the third shot (at t36).

As described above, the apparatus according to the example of FIG. 12 is configured to carry out the photographing processing, the development compression processing, and the writing processing simultaneously in parallel, which can largely decrease the processing time and increase the number of shots that can be picked-up continuously. In addition, the number of shots that can be picked-up per unit time can be made larger than that in the method of alternately carrying out the processes.

Figures 14, 14A:
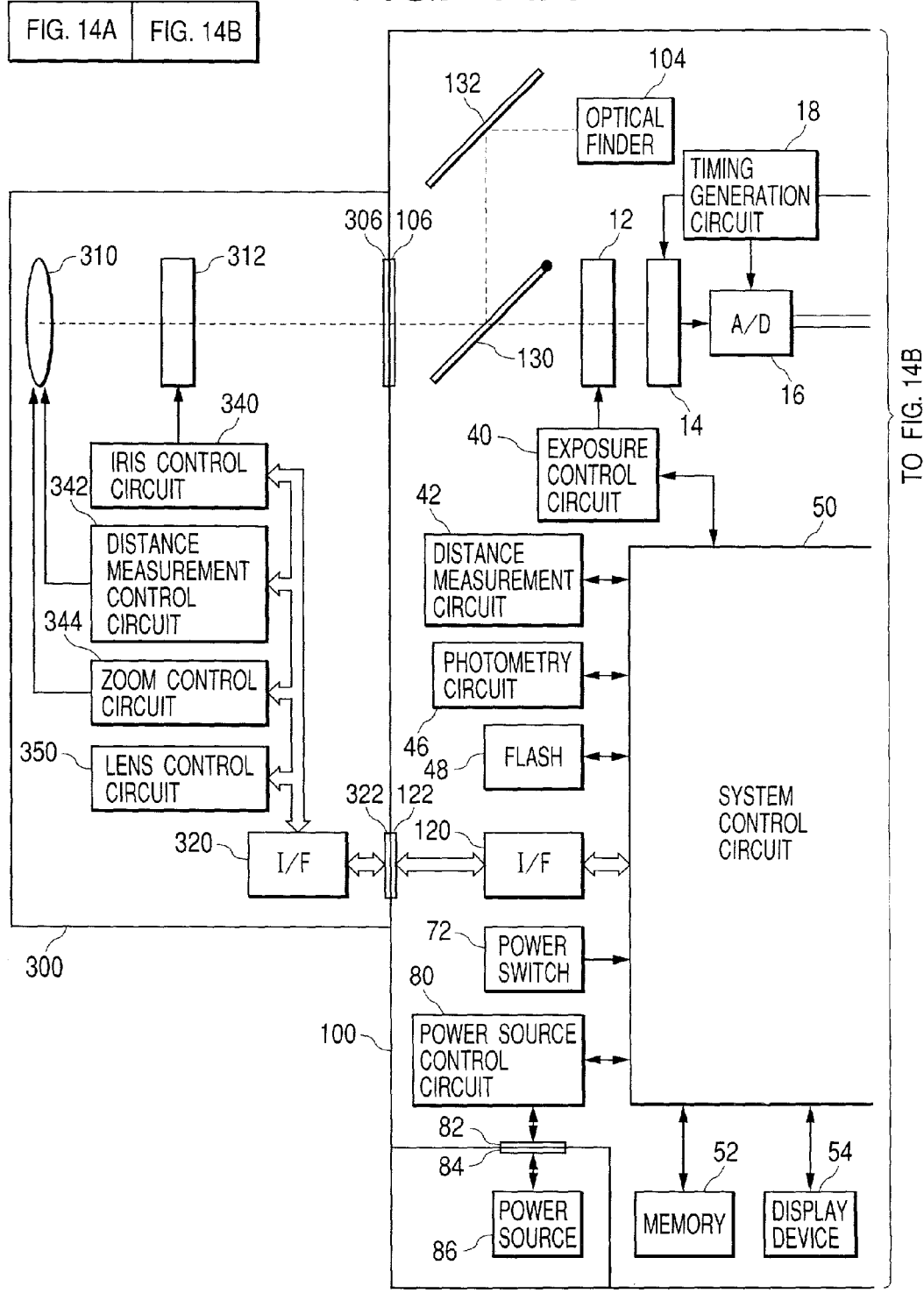
FIG. 14, comprised of FIGS. 14A and 14B, is a block diagram of an image pickup apparatus according to another embodiment of the present invention.
Figure 14B:
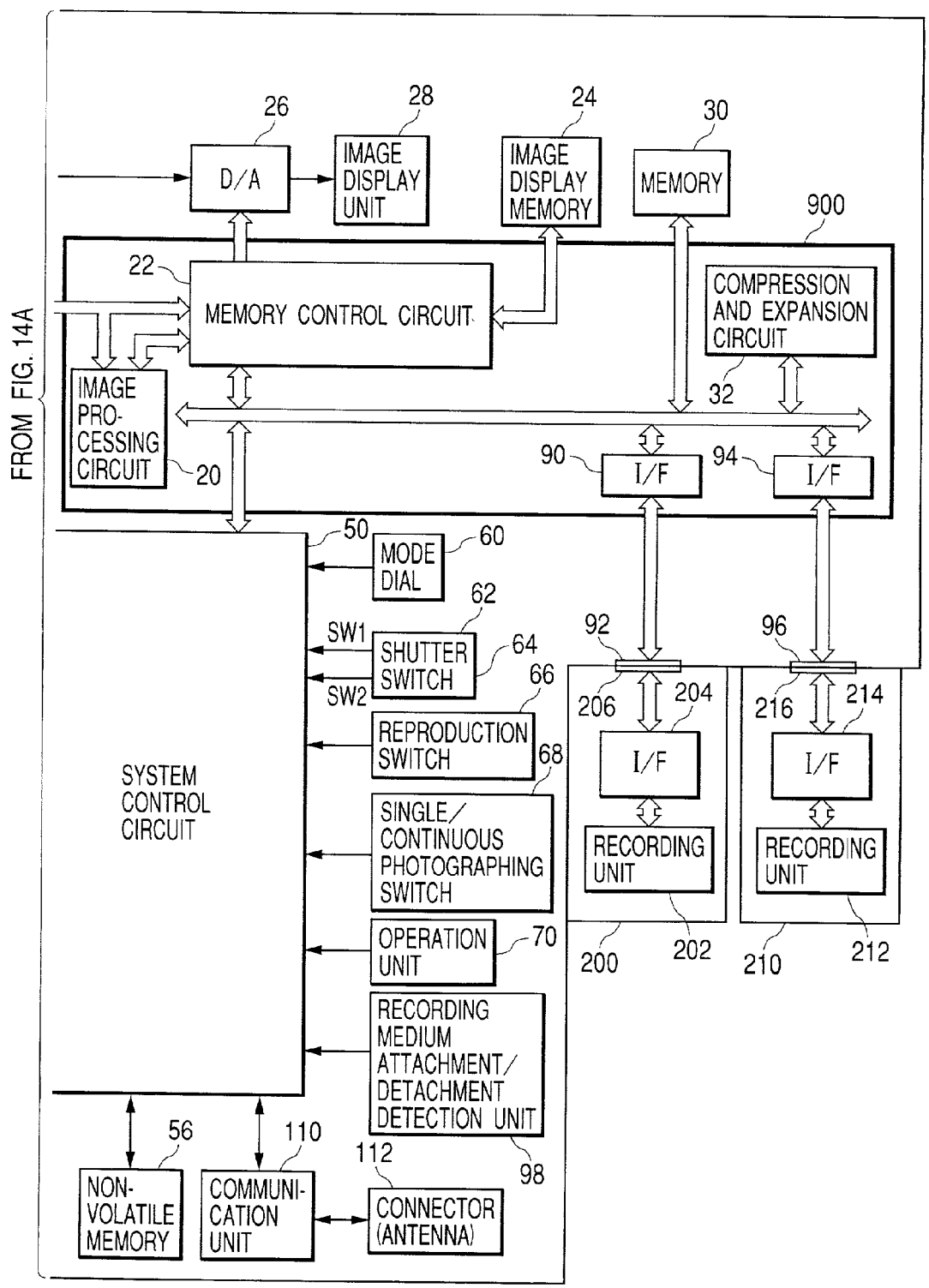

When the configuration of the image pickup apparatus shown in FIGS. 14A and 14B is applied to each of the above examples, the LSI 900 can adapt to various color filter layouts of the image pickup element 14 and various readout methods.

The reason is that the image data inputted into the LSI 900 is data simply digitized from the image data read out of the image pickup element 14, without image processing. A command for the development compression processing given by the system control circuit 50 is varied according to the type of the image pickup element 14, and the image data stored in the memory area M1 is then subjected to the development and compression processing. This configuration can adapt to any type of the image pickup element 14.

For example, conceivable types of color filters for the image pickup element 14 are the primary color filter and the complementary color filter. In addition, conceivable readout methods from the image pickup element are the progressive scan method, the interlace non-add readout method, the interlace add readout method, and so on.

The functional blocks and processing procedures described in the various embodiments above may be configured by hardware as described above, or they may be constructed of a microcomputer system consisting of a CPU or MPU, a ROM, a RAM, etc., the operation of which is implemented according to work programs stored in the ROM and the RAM. The scope of the present invention also encompasses such an embodiment that, for implementing the function of each functional block, a program of software for implementing the function is supplied to the RAM and each functional block is operated according to the program.

In this case, the above program of software itself realizes the functions of each embodiment described above, and thus the program itself, and the means for supplying the program to the computer, for example, a recording medium storing the program, constitute the present invention. The recording medium for storing the program can be either one selected, for example, from a floppy disk, a hard disk, an optical disk, a magneto-optical disk, a CD-ROM, a CD-I, a CD-R, a CD-RW, a DVD, a zip, a magnetic tape, a nonvolatile memory card, and so on, in addition to the foregoing ROM and RAM.

It is also needless to mention that the program is included in the embodiments of the present invention, not only in the case wherein the computer executes the supplied program to implement the functions of the above-stated embodiments, but also in the case wherein the functions of the above-stated embodiments are implemented in cooperation of the program with an OS (operating system) working on the computer or with another application software or the like.

Further, it is also needless to mention that the present invention embraces such embodiments that the supplied program is stored in a memory provided in a function extension board of the computer or in a function extension unit connected to the computer, thereafter a CPU or the like in the function extension board or in the function extension unit executes part or all of the actual processing, based on instructions of the program, and the processing implements the aforementioned functions of the embodiments.

As described above, the apparatus according to each of the above-stated embodiments is configured to execute two processes in parallel, thereby enabling decrease of the total processing time. The method according to the present invention can increase the number of shots that can be picked-up continuously, as compared with the method of first continuously carrying out only the photographing processing. The method according to the present invention can increase the number of shots that can be picked-up per unit time, as compared with the method of alternately carrying out the photographing processing and the development processing.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   an image pickup element;
   a first memory for storing first image data obtained by said image pickup element;
   an image forming processing circuit adapted to effect image forming processing on the first image data read out of said first memory;
   a second memory for storing second image data subjected to the image forming processing by said image forming processing circuit; and
   a memory control circuit adapted to carry out in parallel a writing operation of writing the first image data into said first memory and a writing operation of writing the second image data into said second memory, wherein said memory control circuit carries out the parallel writing operations after said first memory stores at least one image frame of the first image data.

2. The image pickup apparatus according to claim 1, wherein said image forming processing circuit carries out white balance processing and compression processing of the first image data read out of said first memory.

3. The image pickup apparatus according to claim 1, wherein said memory control circuit further carries out a readout operation of reading the second image data stored in said second memory in parallel with the writing operations, to record the second image data in a recording medium.

4. The image pickup apparatus according to claim 1, wherein said image forming processing circuit and said memory control circuit are included on a single integrated circuit.

5. A control method of an image pickup apparatus having an image pickup element, a first memory, a second memory and an image forming processing circuit, said method comprising:
   a first writing step of writing first image data obtained by the image pickup element into the first memory, a reading step of reading the first image data already stored in the first memory;

an image forming processing step for image forming processing on the first image data read out of the first memory in said reading step; and a second writing step of writing second image data subjected to the image forming processing in said image forming processing step into the second memory, wherein said second writing step is performed in parallel with said first writing step after at least one image frame of the first image data is written into the first memory.

* * * * *